Sept. 30, 1941. W. E. HALE 2,257,096

REMOTE CONTROL MECHANISM FOR DRAG SCRAPERS

Filed May 6, 1938 3 Sheets-Sheet 1

WITNESS:

INVENTOR
William E. Hale
BY
Augustus B. Stoughton
ATTORNEY.

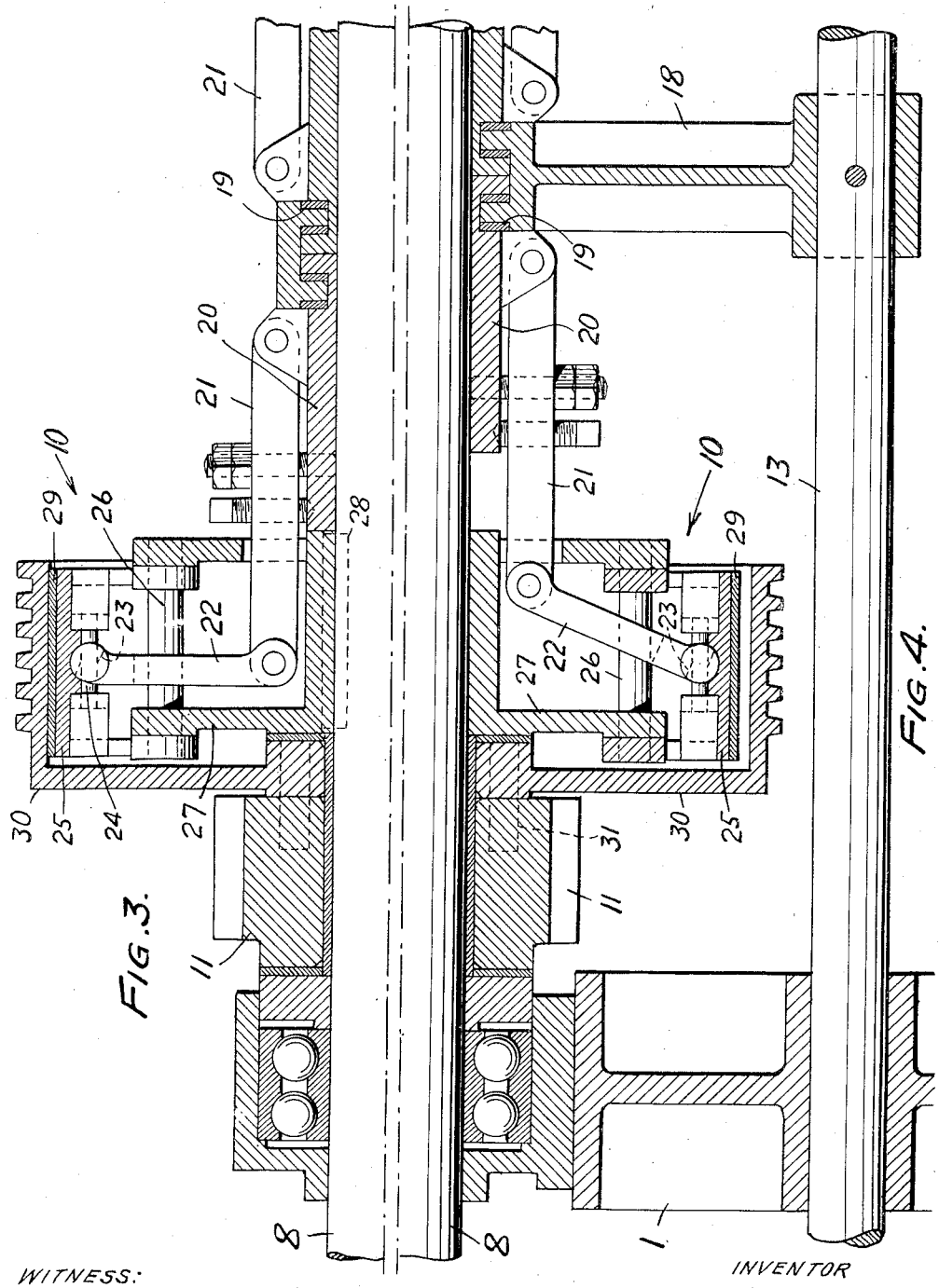

Sept. 30, 1941.　　　　W. E. HALE　　　　2,257,096

REMOTE CONTROL MECHANISM FOR DRAG SCRAPERS

Filed May 6, 1938　　　　3 Sheets-Sheet 3

WITNESS:

INVENTOR
William E. Hale
BY Augustus P. Stoughton.
ATTORNEY.

Patented Sept. 30, 1941

2,257,096

UNITED STATES PATENT OFFICE 2,257,096

REMOTE CONTROL MECHANISM FOR DRAG SCRAPERS

William E. Hale, Fort Washington, Pa., assignor to Beaumont Birch Company, Philadelphia, Pa., a corporation of Pennsylvania Application May 6, 1938, Serial No. 206,382

3 Claims. (Cl. 254—185)

An object of my invention is to provide an electro-mechanical remote control for drag scraper driving drums in which the operator may be located where vision of the entire storage area is obtained regardless of the location of the driving drums.

More specifically, my invention comprises, driving drums for a drag scraper having a counter-shaft, and clutches mounted on said counter-shaft for connecting said drums to said counter-shaft in interlocked relation so that only one drum can be connected to said counter-shaft at a time and be driven by said counter-shaft.

A further feature of my invention consists in the provision of a motor which may be controlled from a remote location such as an electric motor for operating said clutches through an interlocking mechanism which provides that but one clutch can be in engagement at one time.

A further feature of my invention consists in the provision of a hand-operated controller or master switch, an interlocked switch controlled by said master switch and connected to said clutch motor so as to operate said clutch motor in either direction, and a pair of limit switches interlocked with said master switch and with said interlocked switch and operated by said clutch motor so as to cause said clutch motor to move both said clutches to disengaged position when said master switch is released.

For a further exposition of my invention, reference may be had to the annexed drawings and specification, at the end thereof my invention will be specifically pointed out and claimed.

In the drawings:

Fig. 3 is a longitudinal cross-section on an enlarged scale through one-half of one of the clutches and its operating mechanism.

Fig. 4 is a longitudinal view in cross-section through one-half of one of the clutches and a portion of the operating mechanism therefor.

Figure 1:
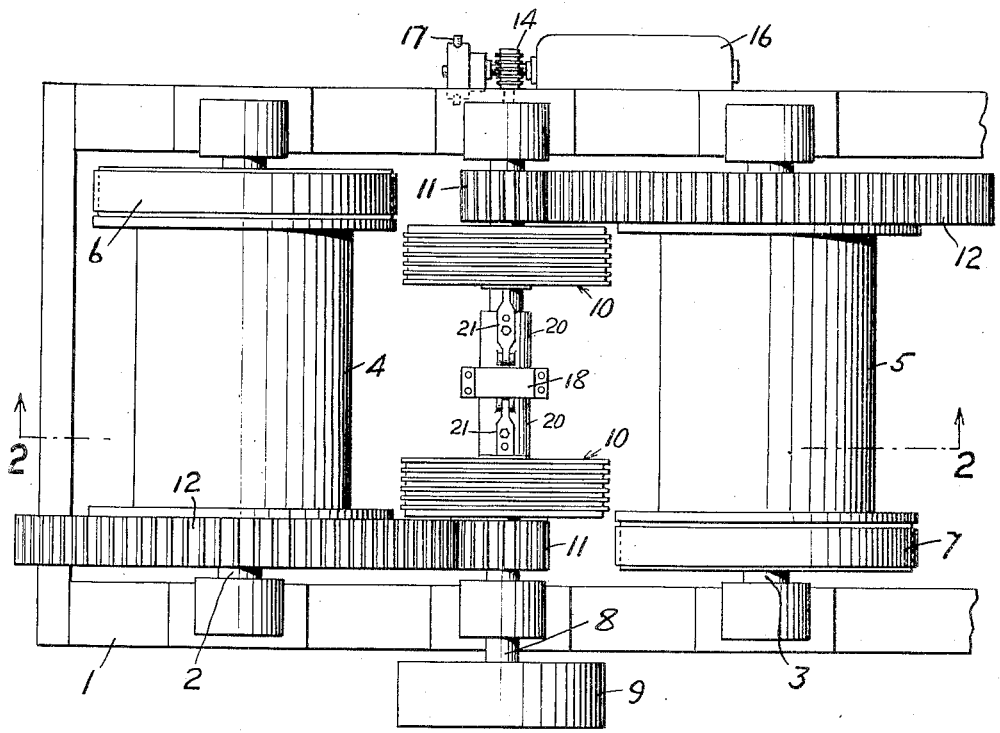
Fig. 1 is a plan view of a portion of my device with the electric wiring omitted.

In that embodiment of my invention chosen from among others for illustration in the drawings and description in the specification, my device is shown as consisting of a frame 1 on which are mounted shafts 2 and 3 which, in turn, carry drag scraper drums 4 and 5. Drums 4 and 5 have associated with them self-energizing brakes 6 and 7 of any well known type (such as those shown in U. S. Patent 913,901 to Lambert) for controlling the speed of said drums in one direction as, for example, when disengaged from the driving shaft and when a drum is paying out cable or in the out-haul direction.

Figure 2:
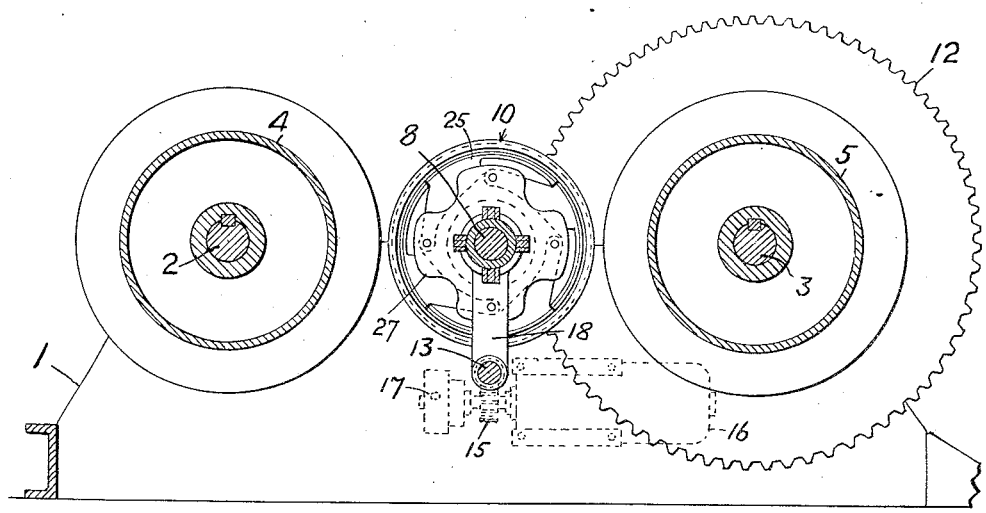
Fig. 2 is a vertical cross-section on line 2—2 of Fig. 1.
Figure 6:
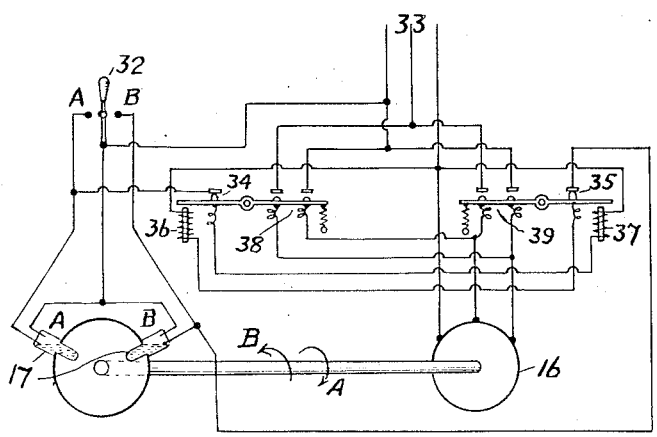
Fig. 6 is an electric diagram showing the circuits.

Adjacent drums 4 and 5 is mounted a counter-shaft to which power may be applied in any convenient manner as by pulley 9 driven from an electric motor or other prime mover. On shaft 8 are mounted clutches generally indicated at 10 which will be hereinafter more fully described. Drive clutch elements carry gears 11 which mesh with gears 12 on drums 4 and 5 so that drum 4 or drum 5 can be driven from shaft 8 through one connection consisting of clutch 10 and gears 11 and 12. Beneath shaft 8, as seen in Figs. 1 and 2, is a clutch shaft 13 having at one end gearing 14 such as a series of concentric circles forming in effect a rack and meshing with a gear 15 driven by clutch motor 16, which is shown as an electric motor of the single, reversing torque (rotating magnet) type. At one end of the shaft of motor 16 are mounted limit switch 17 which may conveniently be glass-encased mercury switches. As shown in Figs. 1 and 6, switches 17 consist of glass containers through which spaced electrodes project and which contain a globule of mercury.

Figure 5:
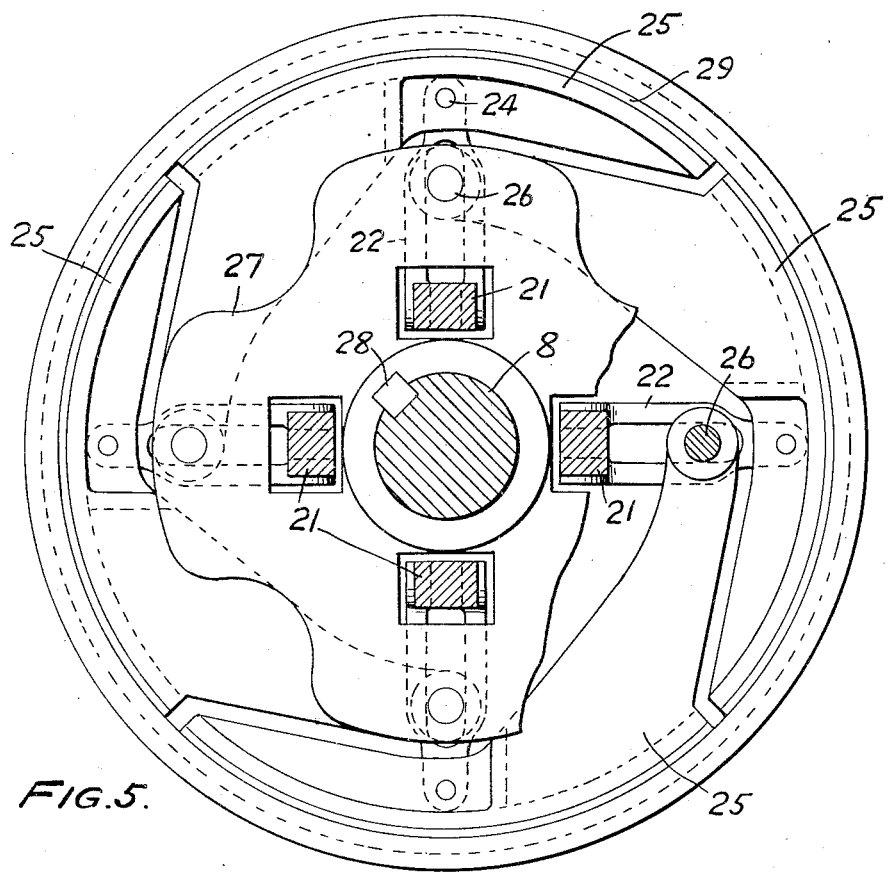
Fig. 5 is an end view of one of the clutches, the parts being in vertical cross-section and broken away.

Referring now more particularly to Figs. 3, 4 and 5, the clutches generally indicated at 10 and the operating mechanism therefor are disclosed. This operating mechanism consists of clutch-shift shaft 13, which is slidably mounted in base 1 and which has pinned or otherwise connected thereto clutch-shifting collar 18 which carries at its inner end thrust washers 19 which bear against clutch collars 20. Clutch collars 20 have pivotally secured thereto clutch bars 21 which have pivotal engagement with clutch links 22, which have at their outer ends flaring or frusto-conical shaped openings 23, through which pass pins 24 secured to the clutch shoes 25 which are pivotally mounted by means of clutch centers 26 on clutch-driving element 27 which is, in turn, secured to shaft 9 by a key 28 or the like.

Clutch shoes 25 carry on their outer faces facings 29 of suitable wear-resistant material adapted for engagement with clutch-driven member 30 secured by means of drive pins 31 to gears 11. Clutch shoes 25 are of the partially self-energized type due to the location of clutch centers 26 and pins 24 relative to the point of engagement of the center of the clutch facing with the clutch-driven member 30. In Fig. 6, there is shown a hand-operated controller or master switch 32 which is connected to one wire leading from a source of electrical energy 33. This master controller 32 is of the spring or gravity-return type, returning to neutral if released by the operator who must hold the handle in right or left position during operation. Mercury switches 17, marked A and B to correspond with the A and B positions of controller 32, are connected in parallel with the two positions of the hand controller and are connected through contacts 34 and 35 with operating magnets 37 and 36, respectively. Magnets 36 and 37 operate contacts 34 and 35, respectively, as well as pairs of contacts 38 and 39 which are interlocked with contacts 34 and 35, respectively, so that, when contacts 34 or 35 are closed, contacts 38 or 39 are opened, and vice versa. It will thus be seen that, when controller 32 moves from the neutral position in which the device is shown in Fig. 6 to position A, it closes circuit from source 33 through contacts 34 to magnet 37, and thereby closes contacts 39 and opens contacts 35, thus operating clutch motor 16 in the direction indicated by the arrow "A." After motor 16 has been moved in this direction for a predetermined distance, limit switch B is closed so that, if controller 32 is then moved to neutral position, limit switch B closes circuit from source 33 through contacts 35, which have re-closed when magnet 37 is de-energized due to movement of controller 32 to neutral position, and magnet 36, thereby closing contacts 38 due to the energization of magnet 36. This causes clutch motor 16 to move in the reverse direction, or that indicated by arrow "B," until limit switch B is again opened so that both clutches are in disengaged position. If controller 32 had been moved to position B, magnet 36 would close contacts 38 and open contacts 34, resulting in reverse operation to that described above.

I do not intend to be limited save as the scope of the prior art and of the attached claims may require.

I claim:

1. A remote control for drag scrapers comprising, a drive shaft, a pair of clutches mounted on said drive shaft, a pair of drums, connections between one of said drums and one of said clutches and connections between the other of said drums and the other of said clutches whereby said clutches control the connection of said drums to said drive shaft, an electric motor, mechanism driven by said motor and arranged to drive both said clutches at one time so as to place one or the other of said clutches into engaged position at one time, limit switches driven by said motor and located so as to be closed when said motor is in either end position of its movement, and electric connections controlling the supply of electricity to said motor and interconnected with said limit switches, said limit switches by said electric connections causing said motor to move into the position in which said clutches are both disengaged when either of said limit switches is closed and connected into circuit.

2. A remote control for a drag scraper comprising, a pair of drag-scraper-cable-receiving drums, a counter-shaft located between said drums and forming a part of the drive for said drums, a connection between each of said drums and said counter-shaft, a clutch forming a part of each of said connections and arranged to connect and disconnect said counter-shaft and said drums, means for moving said clutches simultaneously so that one or the other of said clutches is moved into engaged position at one time, an electric motor for operating said means under the control of an operator, a source of current, a pair of electro-magnetically operated switches controlling the connection between said motor and said source of current, a manually operable controller having a plurality of stationary contacts, each of said contacts being connected to said source of current and through one of said switches to the electro-magnetically operating means of the other switch, and a pair of limit switches driven by said motor and operated because of the position of said motor and each connected in parallel with one of the stationary contacts of said controller and each connected in series through one of said electro-magnetically operated switches to the electro-magnetically operating means of the other switch so that, when either of said limit switches is closed and connected into circuit, said electric motor moves into position in which said clutches are disconnected.

3. A remote control for a drag scraper comprising, a pair of rope-receiving drums, a drive shaft mounted adjacent said drums, a connection between each of said drums and said drive shaft, a clutch forming a part of each of said connections and arranged to connect and disconnect said drums and said drive shaft, clutch-actuating mechanism operable to move said clutches to engaged and disengaged position and connected so that but one of said clutches can be in engaged position at one time, an electric motor arranged to operate said clutch-operating mechanism under the control of an operator, and a pair of limit switches each driven by said motor and located so that one of said limit switches is closed at each end of the movement of the motor, said limit switches being electrically interconnected with said motor so that, when either of said limit switches is closed and connected into circuit, said motor moves into position in which both of said limit switches are open and both of said clutches are disengaged.

WILLIAM E. HALE.